United States Patent Office 2,830,073
Patented Apr. 8, 1958

2,830,073

STABILIZATION OF LACTONITRILE

Erwin Lockwood Carpenter, Stamford, and Richard Lansing Webb, Darien, Conn., assignors to American Cyanamid Company, New York, N. Y., a corporation of Maine No Drawing. Application October 12, 1956
Serial No. 615,451

8 Claims. (Cl. 260—465.6)

This invention relates to the color stabilization of lactonitrile. More particularly, it relates to a method for inhibiting the formation of color in lactonitrile and to the color-stabilized lactonitrile so obtained.

Lactonitrile has been found useful as an intermediate in the preparation of organic compounds, for instance ethyl lactate, and is potentially useful in various other fields. This potential usefulness, however, has never been realized for various reasons among which is the color instability of lactonitrile. On storage for extended periods, even in the absence of light, lactonitrile has been found to discolor to such an extent as to render it unsuited for use. Different batches of lactonitrile may develop color at different rates, but discoloration is a problem characteristic of lactonitrile in general.

It is the principal object of this invention to provide a color-stable lactonitrile composition capable of withstanding extended periods of storage and/or shipment without excessive discoloration. It is a further object of this invention to provide such a color-stable composition without the use of costly addition agents and which meets established standards of purity.

These objects have been met in a simple yet completely effective manner. In general, the method of the present invention comprises adjusting the hydrogen ion concentration of a purified lactonitrile product free of residual reactants and by-products by the use of acetic or phosphoric acid and uniformly dispersing therein a controlled amount of water. This simple operation provides a color stabilizing effect lasting over long periods.

The amount of acid added to the purified lactonitrile may vary. It should be sufficient, however, to reduce the pH to at least about 3.5 when measured on about a 10% solution in water. While the pH may be adjusted to considerably less than 3.5, no additional advantage is gained by going below about 2.0. The preferred range, therefore, is about 2.0–3.5 measured on a 10% solution of lactonitrile in water.

The water content of the stabilized composition may also vary. In general, it should be greater than about 0.5% on the weight of the lactonitrile and usually will be greater than 1% varying to as high as 5%, although more than 5% appears to provide no added advantage.

The composition resulting from the above described treatment may be stored for a considerable period of time without being rendered useless by discoloration. In addition, the composition is stabilized with respect to dissociation of lactonitrile, which is surprisingly less in the treated composition than it is in both an untreated composition and one in which only an acid is employed. The stabilized composition need not be treated prior to use, although if it is desired to do so, the acid and water contents may be readily removed.

The following example illustrates the invention.

EXAMPLE 1

The A. P. H. A. number of distilled lactonitrile (LN) is determined and then 50 gram samples prepared, one of which contains neither acid nor water. The remaining samples have water and acid contents as shown in Table I. The samples are then bottled and capped, stored at room temperature in a dark cabinet and observed periodically for color development. At the end of fourteen months storage, the A. P. H. A. number of each bottled sample is determined.

Table I

| Sample No. | LN (gr.) | $CH_3COOH$ (ml.) | $H_3PO_4$ (ml.) | $H_2O$ (ml.) | pH in 10% sol. | Initial A.P.H.A. | Final A.P.H.A. | Total HCN detd. as LN percent |
|---|---|---|---|---|---|---|---|---|
| 1 | 50 | | | | 4.4 | <1 | 1180 | 97.8 |
| 2 | 50 | 1.25 | | | 3.0 | <1 | 79 | 95.5 |
| 3 | 50 | 1.25 | | 2.5 | 3.0 | <1 | 4 | 98.7 |
| 4 | 50 | | 0.5 | | 2.06 | <1 | 150 | 97.6 |
| 5 | 50 | | 0.5 | 2.5 | 2.06 | <1 | 7 | 98.9 |

We claim:

1. A method of color stabilizing lactonitrile and minimizing the dissociation thereof which comprises adjusting the hydrogen ion concentration of lactonitrile to a pH less than about 3.5 measured on a 10% solution of lactonitrile in water by incorporating in said lactonitrile a sufficient amount of an acid selected from the group consisting of acetic and phosphoric, and adding water to said lactonitrile in amount of at least 0.5% on the weight of the lactonitrile.

2. A method according to claim 1 in which the pH is adjusted to about 2.0–3.5 and the water content is not more than about 5%.

3. A method according to claim 2 in which the acid is acetic.

4. A method according to claim 2 in which the acid is phosphoric.

5. A color-stable lactonitrile composition comprising lactonitrile having incorporated therein an acid selected from the group consisting of acetic and phosphoric in amount sufficient to provide a pH less than about 3.5 when measured on a 10% solution of lactonitrile in water, and at least 0.5% water on the weight of the lactonitrile.

6. A composition according to claim 5 in which the pH is about 2.0–3.5 and the water content is not more than 5%.

7. A composition according to claim 5 in which the acid is acetic.

8. A composition according to claim 5 in which the acid is phosphoric.

References Cited in the file of this patent

UNITED STATES PATENTS

| 2,416,624 | Hansley | Feb. 25, 1947 |
| 2,537,814 | Davis | Jan. 9, 1951 |

FOREIGN PATENTS

| 481,624 | Canada | Mar. 11, 1952 |
| 691,269 | Great Britain | May 6, 1953 |